United States Patent [19]

Rosenquist

[11] Patent Number: 4,960,839

[45] Date of Patent: Oct. 2, 1990

[54] METHOD OF MAKING A POLYCARBONATE CROSS-LINKED RESIN

[75] Inventor: Niles R. Rosenquist, Evansville, Ind.

[73] Assignee: General Electric Company, Mt. Vernon, Ind.

[21] Appl. No.: 414,165

[22] Filed: Sep. 28, 1989

Related U.S. Application Data

[62] Division of Ser. No. 281,141, Dec. 7, 1988, abandoned.

[51] Int. Cl.$^5$ .............................................. C08G 63/62
[52] U.S. Cl. .................................... 525/462; 525/461; 525/433; 528/196
[58] Field of Search ....................... 525/433, 461, 462; 528/196

[56] References Cited

U.S. PATENT DOCUMENTS 3,291,774  12/1966  Bolgiano ............................ 528/196

Primary Examiner—Harold D. Anderson
Assistant Examiner—T. Mosley
Attorney, Agent, or Firm—Martin Barancik; Joseph Eisele

[57] ABSTRACT

Polycarbonate resins containing at least one divalent chain unit of the formula:

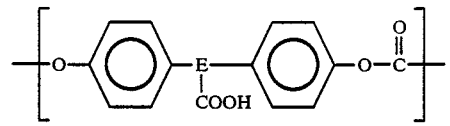

wherein E represents a trivalent hydrocarbon radical, or a trivalent halogen-substituted hydrocarbon radical, are transitory cross-linkers prepared by thermal degradation of the corresponding acid esters (the ester group being removable under conditions of the degradation by a beta-elimination mechanism). Cross-linked polycarbonate resins exhibit enhanced fire-resistance, especially non-dripping. The cross-linkers are useful to cross-link any resin having a group reactive with a carboxyl group.

10 Claims, No Drawings

METHOD OF MAKING A POLYCARBONATE CROSS-LINKED RESIN

This is a division of copending application Ser. No. 281,141, filed Dec. 7, 1988, now abandoned.

BACKGROUND OF THE INVENTION

1. Field of the Invention

The invention relates to polycarbonate resins and more particularly relates to branched or cross-linked, fire-resistant polycarbonate resins and intermediates thereto.

2. Brief Description of the Prior Art

Polycarbonate resins have found wide usage to fabricate a wide variety of articles such as automotive component parts. Polycarbonate resins of the present invention include ones that are cross-linked to enhance their properties of fire resistance and particularly the characteristic of "non-dripping" when exposed to high temperatures and open flames. The term "non-dripping" as used herein means that when exposed to high temperatures, particularly open flame, articles molded from the resins do not "melt" or liquify so as to form liquid drops (drippings).

A wide variety of copolyester-carbonate resins are also known in the prior art as is the method of their preparation; see for example U.S. Pat. No. 4,487,896.

Copolycarbonates of bisphenol-A and 4,4-bis(4-hydroxyphenyl) alkanoates were described by Fischer, et al., Journal of Applied Polymer Science, Vol. 10, pp. 245-252 (1966).

The U.S. Pat. No. 3,285,875 to Battenbruch et al. describes the cross-linking or "curing" of polycarbonate resins by a transesterification method, resulting in a molecular weight build-up of the resin. The method mandates the use of a transesterification catalyst.

SUMMARY OF THE INVENTION

The invention comprises a transitory polycarbonate resin, containing in the polymer chain at least one divalent moiety of the formula:

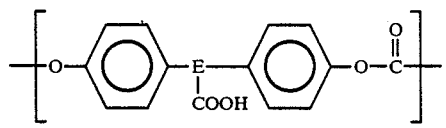

wherein E is selected from the group consisting of trivalent hydrocarbon radicals containing from 1 to 15 carbon atoms, inclusive, and halogen-substituted trivalent hydrocarbon radicals containing from 1 to 15 carbon atoms, inclusive.

The term "trivalent hydrocarbon radical" as used herein means hydrocarbyl as defined below, wherein two additional hydrogen atoms have been removed.

The transitory resins of the invention are useful as intermediates in the preparation of branched or cross-linked polycarbonate resins.

The invention also comprises branched or cross-linked polycarbonate resin compositions prepared with the use of the polycarbonate resins having chain moieties of the Formula (I). The cross-linked polycarbonates of the invention are characterized-in-part by an enhanced non-dripping property when exposed to high temperatures or open flame.

DETAILED DESCRIPTION OF THE PREFERRED EMBODIMENTS OF THE INVENTION

The polycarbonate resins of the invention, i.e.; the resins containing a unit of the Formula (I), may be prepared by the thermolytic degradation of corresponding polycarbonate resins having chain units of the formula:

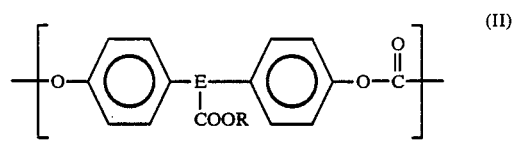

wherein E is as previously defined and R is a hydrocarbyl group or a halogen-substituted hydrocarbyl group which is amenable to beta-elimination upon exposure to heat.

The term "hydrocarbyl" as used herein means the monovalent moiety obtained upon removal of a hydrogen atom from a parent hydrocarbon. Representative of aliphatic hydrocarbyl are alkyl of 1 to 15 carbon atoms, inclusive such as methyl, ethyl, propyl, butyl, pentyl, hexyl, heptyl, octyl, nonyl, decyl, undecyl, dodecyl, tridecyl, tetradecyl, pentadecyl and isomers thereof; cycloalkyl of 3 to 8 carbon atoms, inclusive, such as cyclopropyl, cyclobutyl, cyclopentyl, cyclohexyl, cycloheptyl, cyclooctyl; alkyl substituted cycloalkyl of 4 to 15 carbon atoms, inclusive, such as 2-methylcyclopropyl, 3,4-dimethylcyclohexyl; alkenyl of 3 to 15 carbon atoms, inclusive, such as allyl, 3-hexenyl, 2,4-pentadienyl; and aralkyl of 7 to 15 carbon atoms, inclusive, such as benzyl, phenethyl, phenpropyl, phenbutyl, phenoctyl and the like. In the formula (II) given above preferred hydrocarbyl groups have a hydrogen atom on the carbon beta to the oxa atom in the structure of the Formula (II), for example ethyl and isopropyl. Preferably R represents an alkyl or a cycloalkyl group amenable to removal by thermal degradation.

The term "halogen" is used herein in its normally accepted sense as embracive of chlorine, bromine, iodine and fluorine.

Thermal degradation of the polycarbobate resins containing units of the Formula (II) given above yield the corresponding polymers having units of the Formula (I). The thermal degradation, i.e.; exposure to temperatures of 100° C. to 350° C., preferably 200° C. to 300° C., is for a period of time sufficient to effect removal of the R group (generally 5 to 60 minutes). Under the conditions of the thermolytic degradation to remove the R groups, transitory carboxyl groups are formed, i.e.; units of the Formula (I) where the R group is replaced with a hydrogen atom, creating a cross-linking site (the carboxyl group-bearing moiety). The active crossing-link site may immediately react to cross-link with an adjacent polycarbonate resin chain. This is believed to occur by reaction of the generated free $CO_2H$ group with a carbonate or ester functional group in a repeat unit of an adjacent resin chain. Preferably, the thermal degradation is carried out in the absence of a transesterification catalyst.

The polycarbonate resins of the invention having chain units of the Formula (I) as given above may be used in at least two different ways as cross-linkers of known polycarbonate resins. First, when prepared as a relatively small ingredient of a known polycarbonate resin composition, i.e.; when the proportion of polymer units of the Formula (II) is relatively low in the polymer product of the polymerization, there occurs a composition containing both known polycarbonate chains [without chain moieties of the formula (II)] and the chains having units of the Formula (II). The latter polymer chains may then be subjected to degradative conditions as previously described for removal of the R group, whereupon cross-linking with the adjacent known resin chains, also present occurs as described above.

In a second manner of use, polycarbonate resin compositions may be prepared having a relatively high content of the chain units of the Formula (II). These compositions may be added in any desired proportion to known and conventional polycarbonate resin compositions as additive cross-linking agent precursors and upon exposure of the resulting mixtures to conditions for removal of the R group as described above, will function as cross-linkers.

The cross-linked polycarbonate resin product compositions of the invention exhibit improvements in certain physical properties of molded articles such as heat resistance, solvent resistance, thermal creep resistance, flame resistance and drip retardancy, compared to the precursor uncross-linked polycarbonate resins.

The polycarbonate resin cross-linkers and cross-linked resins of the invention described above may have a weight average molecular weight of from about 10,000 to about 200,000, preferably from about 30,000 to about 50,000 and an intrinsic viscosity, as measured in methylene chloride at 25° C., of at least about 0.25 dl/gm, preferably from about 0.45 to about 1.40 dl/gm.

The resin compositions containing polymers having chain units of the Formula (II) may also be admixed with various commonly known and used processing additives such as, for example, antioxidants; antistatic agents; inert fillers such as glass, talc, mica, and clay; ultraviolet radiation absorbers such as the benzophenones, benzotriazoles, and the like; hydrolytic stabilizers such as the epoxides disclosed in U.S. Pat. Nos. 3,489,716, 4,138,379 and 3,839,247, all of which are incorporated herein by reference; color stabilizers such as the organophosphites; thermal stabilizers such as a phosphite; and flame retardants. A wide variety of flame retardancy additives useful in polycarbonate and copolyester-carbonate resin compositions are known and may be employed herein. Some particularly useful flame retardants are the alkali and alkaline earth metal salts of sulfonic acids. These types of flame retardants are disclosed in U.S. Pat. Nos. 3,775,367; 3,933,734; 3,931,100; 3,978,024; 3,948,851; 3,926,980; 3,919,167; 3,909,490; 3,953,396; 3,953,300; 3,917,559; 3,951,910 and 3,940,366, all of which are hereby incorporated herein by reference thereto. Upon thermal degradation of these compositions, cross-linked compositions of the invention are also obtained.

The term "polycarbonate resin" as used herein means synthetic polymeric resins containing recurring chain units of the formula:

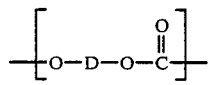

(III)

wherein D is a divalent aromatic radical of the dihydric phenol employed in the polymerization reaction, which comprises the reaction of the dihydric phenol with a carbonate precursor.

Polycarbonate resins and their method of preparation are well known; see for example the details provided in the U.S. Pat. Nos. 3,028,365; 3,334,154; 3,275,601; 3,915,926; 3,030,331; 3,169,121; 3,027,814; and 4,188,314, all of which are incorporated herein by reference thereto.

In general, the method of polymerization comprises the reaction of a dihydric phenol with a carbonyl halide (the carbonate precursor).

Although the reaction conditions of the preparative processes may vary, the interfacial polymerization processes typically involve dissolving or dispersing the phenol reactant in a suitable water immiscible solvent medium and contacting the reactants with the carbonate precursor, such as phosgene, in the presence of a suitable catalyst and an aqueous caustic solution under controlled pH conditions. The most commonly used water immiscible solvents include methylene chloride, 1,1-dichloroethane, chlorobenzene, toluene, and the like.

The catalyst employed accelerates the rate of polymerization of the dihydric phenol reactant with the carbonate precursor. Representative catalysts include but are not limited to tertiary amines such as triethylamine, quaternary phosphonium compounds, quaternary ammonium compounds, and the like. The preferred process for preparing polycarbonate resins of the invention comprises a phosgenation reaction. The temperature at which the phosgenation reaction proceeds may vary from below 0° C., to above 100° C. The phosgenation reaction preferably proceeds at temperatures of from room temperatures (25° C.) to 50° C. Since the reaction is exothermic, the rate of phosgene addition may be used to control the reaction temperature. The amount of phosgene required will generally depend upon the amount of the dihydric phenol and the amount of any dicarboxylic acid also present.

Dihydric phenol reactants employed to prepare polycarbonate resins are generally well known compounds as are methods of their preparation. Representative of such dihydric phenols are phenolic diols of the general formula:

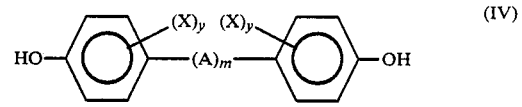

(IV)

wherein A is selected from the group consisting of a divalent hydrocarbon radical containing from 1 to about 15 carbon atoms; a halogen-substituted divalent hydrocarbon radical containing from 1 to about 15 carbon atoms and divalent groups such as:

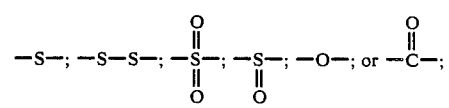

Each X in the Formula (IV) is independently selected from the group consisting of halogen, hydrocarbyl such as an alkyl group of from 1 to about 8 carbon atoms; an aryl group of from 6-18 carbon atoms, an aralkyl group of from 7 to about 14 carbon atoms, an oxyalkyl group of from 1 to about 8 carbon atoms, and an oxyaryl group of from 6 to 19 carbon atoms; and wherein m is zero or 1 and y is a whole number integer of from 0 to 4, inclusive.

Typical of some of the dihydric phenols that are advantageously employed are bis-phenols such as bis(4-hydroxyphenyl) methane, 2,2-bis(4-hydroxy-3-methylphenyl)propane, 4,4-bis(4-hydroxyphenyl)heptane, 2,2-bis(4-hydroxy-3,5-dichlorophenyl)propane, 2,2-bis(4-hydroxy-3,5-dibromophenyl)propane; dihydric phenyl ethers such as bis(4-hydroxphenyl)ether, bis(3,5-dichloro-4-hydroxyphenyl)ether; dihydroxybiphenyls such as 3,3'-dichloro-4,4'-dihydroxybiphenyl; dihydroxyaryl sulfones such as bis(4-hydroxyphenyl)sulfone, bis(3,5-dimethyl-4-hydroxyphenyl)sulfone; dihydroxy benzenes, such as resorcinol, hydroquinone, halo- and alkyl-substituted dihydroxy benzenes such as 1,4- dihydroxy-2,5-dichlorobenzene, 1,4-dihydroxy-3-methylbenzene; and dihydroxy diphenyl sulfides and sulfoxides such as bis(4-hydroxyphenyl)-sulfide and bis(4-hydroxyphenyl) sulfoxide. A variety of additional dihydric phenols are also available and are disclosed in U.S. Pat. Nos. 2,999,835; 3,028,365 and 3,153,008, all of which are incorporated herein by reference. It is, of course, possible to employ two or more different dihydric phenols or a combination of a dihydric phenol with glycol.

Preferred dihydric phenols of Formula (IV) are the 4,4'-bisphenols.

The carbonate precursor employed in the preparation of known polycarbonate resins as well as resins having chains including the moieties of Formula (II) may be a carbonyl halide, a diarylcarbonate, or a bishaloformate. The carbonyl halides include carbonyl bromide, carbonyl chloride, and mixtures thereof. The bishaloformates include the bishaloformates of dihydric phenols such as bischloroformates of 2,3-bis(4-hydroxyphenyl)-propane, hydroquinone, and the like; or the bischloroformates of glycols such as the bischloroformates of ethylene glycol, neopentylene glycol, polyethylene glycol, and the like. Typical of diarylcarbonates which may be employed are diphenyl carbonate, and the di(alkylphenyl)-carbonates such as di(tolyl)carbonate. Some other non-limiting illustrative examples of suitable diarylcarbonates include di(napthyl)carbonate, phenyl tolyl carbonate, and the like.

The preferred carbonate precursors are the carbonyl halides, with carbonyl chloride, also known as phosgene, being the preferred carbonyl halide.

The term "polycarbonate" as used herein is also inclusive of copolyester-polycarbonates, i.e.; resins which contain in addition to recurring polycarbonate chain units of Formula (III) given above, repeating or recurring carboxylate units, for example of the formula:

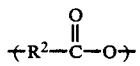

wherein $R^2$ is as defined below.

The copolyester-polycarbonate resins are also prepared by polymerization techniques, well known to those skilled in the art; see for example the U.S. Pat. Nos. 3,169,121 and 4,487,896.

In general the copolyester-polycarbonate resins are prepared as described above for the preparation of polycarbonate homopolymers, but by the added presence of a difunctional carboxylic acid (ester precursor) in the water immiscible solvent.

In general, any difunctional carboxylic acid (dicarboxylic acid) conventionally used in the preparation of linear polyesters may be utilized in the preparation of the copolyester-carbonate resins of the instant invention. Generally, the difunctional carboxylic acids which may be utilized include the aliphatic carboxylic acids, the aromatic carboxylic acids, and the aliphatic-aromatic carboxylic acids. These acids are well known and are disclosed for example in U.S. Pat. No. 3,169,121, which is hereby incorporated herein by reference. Representative of such difunctional carboxylic acids are difunctional carboxylic acids of the formula:

$$HOOC\text{-}(R^2)\text{-}COOH \qquad (V)$$

wherein $R^2$ is a divalent hydrocarbylene group such as an alkylene, alkylidene, or cycloalkylene group; an alkylene, alkylidene or cycloalkylene group containing ethylenic unsaturation; an aromatic group such as phenylene, biphenylene, and the like; two or more aromatic groups connected through non-aromatic linkages such as alkylene or alkylidene groups; and a divalent aralkyl radical such as tolylene, xylylene, and the like.

Preferred difunctional carboxylic acids employed are the aromatic dicarboxylic acids. Particularly useful aromatic dicarboxylic acids are those represented by the general formula:

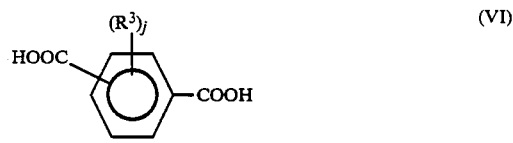

wherein j is a positive whole integer having a value of from 0 to 4 inclusive; and each $R^3$ is independently selected from the group consisting of alkyl radicals, preferably lower alkyl radicals (containing from 1 to about 5 carbon atoms).

Mixtures of these difunctional carboxylic acids may be employed as well as single acids. Therefore, where the term difunctional carboxylic acid is used herein it is to be understood that this term includes mixtures of two or more different difunctional carboxylic acids as well as individual carboxylic acids.

Most preferred as aromatic dicarboxylic acids are isophthalic acid, terephthalic acids, and mixtures thereof. A particularly useful difunctional carboxylic acid comprises a mixture of isophthalic acid and terephthalic acid wherein the weight ratio of terephthalic acid to isophthalic acid is in the range of from about 10:1 to about 0.2:9.8.

Rather than utilizing the difunctional carboxylic acid per se, it is possible, and sometimes even preferred, to employ the reactive derivatives of said acid. Illustrative of these reactive derivatives are the acid halides. The preferred acid halides are the acid dichlorides and the acid dibromides. Thus, for example, instead of using isophthalic acid, terephthalic acid or mixtures thereof, it is possible to employ isophthaloyl dichloride, terephthaloyl dichloride, and mixtures thereof. It should be understood that when the term "difunctional carboxylic acid" is used herein, included are the reactive derivatives.

The proportions of reactants employed to prepare the copolyester-carbonate resins of the invention will vary in accordance with the proposed use of the product resin. Those skilled in the art are aware of useful proportions, as described in the U.S. patents referred to above. In general, the amount of the ester bonds may be from about 5 to about 90 mole percent, preferably from about 35 to about 80 mole percent, relative to the carbonate bonds. For example, 5 moles of bisphenol-A reacting completely with 4 moles of isophthaloyl dichloride and 1 mole of phosgene would give a copolyester-carbonate of 80 mole percent ester bonds.

Also included within the scope of the instant invention are randomly branched polycarbonate resins wherein a minor amount (typically between 0.05 and 2 mole percent, based on the quantity of dihydric phenol used) of a polyfunctional aromatic compound is a co-reactant with the dihydric phenol in the reaction mixture, comprising also the carbonate precursor and optionally the ester precursor; to provide a thermoplastic randomly branched polycarbonate. These polyfunctional aromatic compounds may be hydroxyl, carboxyl, carboxylic anhydride, haloformyl, or mixtures thereof. Some illustrative non-limiting examples of these polyfunctional compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic acid anhydride, and the like. Other organic polyfunctional compounds useful in making randomly branched polycarbonates are disclosed in U.S. Pat. Nos. 3,635,895 and 4,001,184, both of which are incorporated herein by reference.

In the conventional polymerization methods of preparing polycarbonates, a molecular weight regulator (a chain stopper) is generally added to the reaction mixture prior to or during the contacting with a carbonate precursor. Useful molecular weight regulators include, but are not limited to, monohydric phenols such as phenol, chroman-I, paratertiarybutylphenol, p-cumylphenol and the like. Techniques for the control of molecular weight are well known in the art and are used for controlling the molecular weight of the resins of the present invention.

Polycarbonate resins having polymer chain units of the Formula (II) given above are generally well known and may be prepared by the method described by Fischer et al., supra. The method comprises, in brief, polymerization of a dihydric phenol ester of the formula:

 (VII)

wherein E and R are is as previously defined, with a carbonate precursor as previously described, preferably with the additional presence of a dihydric phenol of the Formula (IV) given above.

The polymerization may be carried out employing only dihydric phenol esters of the Formula (VII) given above, or with a mixture of the phenol esters (VII) with dihydric phenols of the Formula (IV) previously described. Although any proportion of the dihydric phenols (IV) and (VII) may be used, for example, in a mole ratio of from 1 to 99:99–1, there is a preference for a mole ratio of 2 to 50:50 to 98 VII:IV.

The diphenol esters of the Formula (VII) may be prepared by esterifying the corresponding acids, i.e.; the diphenols of the Formula (VII) wherein R is hydrogen, with an appropriate alcohol of the formula:

 (VIII)

wherein R represents hydrocarbyl or halogen-substituted hydrocarbyl amenable to beta-elimination as described above, in the presence of an esterification catalyst such as an organic acid. The esterification is advantageously carried out in the presence of an inert organic solvent for the reactants and the ester product or a large excess of the alcohol (VIII); see Fischer et al., supra. The ester product is separated from the reaction mixture by conventional techniques of extraction, washing and solvent removal. Alternatively, the esters of formula (VII) may be prepared by the method described in British Patent specification 952,591.

Alcohols of the Formula (VIII) given above are generally well known and include, for example, cyclohexyl alcohol, 4-tert-butyl-cyclohexyl alcohol and, preferably, ethyl alcohol, isopropyl alcohol or 1-ethylpropyl alcohol. Also useful are the halogen-substituted hydrocarbon alcohols.

The following examples and preparations describe the manner and process of making and using the invention and set forth the best mode contemplated by the inventor of carrying out the invention but are not to be construed as limiting the invention. Where reported, the following tests were carried out:

Intrinsic Viscosity (IV)

The intrinsic viscosity was measured at a temperature of 25° C. in methylene chloride and is reported in deciliters/gram (dl/g).

Glass Transition Temperature (Tg):

The glass transition temperatures were determined by using a Perkin-Elmer DSC-2B instrument which measures the glass transition temperature or (Tg) by differential scanning calorimetry.

Degree of Cross-Linking (gel formation); Gel Analysis

Five gram samples of the resin powder were placed in petri dishes pre-treated with a silicone-based mold release agent, and the dishes placed in a 300° C./3mm vacuum oven for either ½ or one hour. Only two samples were heat treated at a time in this manner and they were placed side-by-side in identical positions in the oven in order to avoid possible variability in test temperature due to non-uniformity of temperature within the oven.

Two gram samples of each heat treated resin were then allowed to stand in 150 ml methylene chloride for 24 hours. Any gels that formed were then separated from the solution, and the solvent removed to provide a sample of the soluble resin for IV analysis. The gels were then extracted three more times with 150 ml portions of methylene chloride, with the samples being allowed to stand 48 hours, 48 hours and 3 hours respectively. After the third and fourth extractions the samples were dried and weighed, and in all cases were found to show no additional loss in weight on the fourth extraction. The percent of gel is the residual weight divided by the original weight of the heat-aged material, multiplied by 100.

PREPARATION 1

Isopropyl Diphenolate—In a 3000 ml flask fitted with a Dean-Stark trap were mixed 572 g (2.0 moles) diphenolic acid, 1500 ml isopropanol and 10 g toluene sulfonic acid. The mixture was refluxed for 22 hrs, with gradual removal of 500 ml of condensate (From azeotrope tables, the condensate should be 12% water). 1000 ml methylene chloride and 1000 ml water were then mixed with the reaction mixture and the methylene chloride layer then washed with water until washings were pH 5. Drying over $MgSO_4$ and removal of solvent yielded 631 g of crystalline solid. Recrystallization from 500 ml ethyl acetate and careful washing with 3X 50 ml ethyl acetate yielded 498 g of powder, mp 128°–130.5° C. and nmr indicating the desired compound in good purity. Recrystallization of a sample a second time from ethyl acetate did not change the mp.

PREPARATION 2

Ethyl Diphenolate, 572 g (2.0 mole) diphenolic acid was reacted with 1000 ml ethanol and 10 g toluene sulfonic acid for 30 hrs with removal of 750 ml of volatiles using the same procedure as described for the isopropyl ester. Work-up and re-crystallization were also the same, yielding 320 g of crystalline product with M.P. of 124°–129° C. and with nmr indicating the desired compound in good purity. Partial removal of solvent from the mother liquor yielded about 150 g additional crystals, which was mixed with crude product from other batches and re-crystallized again.

PREPARATION 3

1—Ethypropyl Dipenolate—572 g (2.0 mole) diphenolic acid was reacted with 220 g (2.5 mole) 3- pentanol and 5 g toluene sulfonic acid in 1000 ml toluene for 26 hours using the procedure used for the isopropyl ester. A water layer separated in the Dean Stark trap and about 37 ml was collected. After work-up as for the isopropyl ester, solvent was removed until volume was 1200 ml. On standing for 3 days, 315 g of crystals formed. The crystals were washed with 250 ml of 9/1 mixture of toluene/ethyl acetate to remove colored impurities, then recrystallized from 300 ml of 7% ethyl acetate in toluene to yield 240 g of slightly pink solid, with M.P. of 130°–135.5° C. and nmr indicating the desired compound in good purity.

EXAMPLE 1 (COMPARATIVE EXAMPLE)

This example is not an example of the invention but is made for comparative purposes.

A 3000 ml four neck flask was fitted with a mechanical stirrer, a pH probe, an aqueous caustic inlet tube and a Claisen adaptor to which was attached a dry ice condenser and a gas inlet tube. To the flask was added 560 ml water, 680 ml methylene chloride, 2.8 ml triethylamine (0.02 mole), 1.65 g (0.0175 mole, 3.5 mole %) phenol and 114 g (0.50 mole) bisphenol-A. With stirring the pH raised to 10 by addition of 25% aqueous sodium hydroxide, then phosgene was introduced into the flask at lg/min for 60 minutes (0.6 mole) with pH maintained at 9.5 to 11.5. The pH was adjusted to 11 at the end of the reaction. The resin layer was separated from the brine layer, washed with 3 weight percent aqueous HCl until washings remained acidic, then twice with distilled water. The resin was then precipitated into 3000 ml of methanol in a Warning blender, then washed with additional methanol and dried.

The intrinsic viscosity (IV), glass transition temperature (Tg) and percent of gels is set forth in Table 1, below.

EXAMPLES 2-7

The procedure of Example 1, supra., is repeated except that a proportion (from 0.01 moles to 0.025 moles) of the bisphenol-A as used therein is replaced with equal proportions of ethyl diphenolate (Preparation 2, supra), isopropyl diphenolate (Preparation 1, supra) and 1-ethylpropyl diphenolate, (Preparation 3, supra), respectively.

The intrinsic viscosity (IV), glass transition temperature (Tg) and percent of gels observed for the product resins are set forth in the Table 1, below, with the composition structure.

TABLE 1

| Example No. | Ester Resin Composition | | Initial Resin Properties | | 30 min at 300° C. | | 60 min at 300° C. | |
| --- | --- | --- | --- | --- | --- | --- | --- | --- |
| | Mole % | Structure of R | IV dl/g | Tg °C. | IV[1] | % gels | IV[1] | % gels |
| 1. Control | 0% | — | 0.472 | 150° | 0.522 | 0% | 0.540 | 0% |
| 2. | 2% | ethyl | 0.471 | 147° | 0.541 | 0% | 0.647 | 0%[2] |
| 3. | 5% | ethyl | 0.421 | 143° | 0.833 | 0%[2] | 0.820 | 36% |
| 4. | 2% | isopropyl | 0.396 | 142° | 0.702 | 38% | 0.316 | 69% |
| 5. | 5% | isopropyl | 0.467 | 146° | 0.335 | 84% | —[3] | 94% |
| 6. | 2% | 1-ethylpropyl | 0.459 | 148° | 0.780 | 46% | 0.425 | 73% |
| 7. | 5% | 1-ethylpropyl | 0.460 | 144° | 0.349 | 85% | —[3] | 95% |

[1] IV of soluble portion from extraction of gel
[2] Trace of gel observed visually, but weight was too low to detect by the procedure used
[3] Insufficient amount of sample for IV testing

EXAMPLE 8

To a reactor fitted with a mechanical agitator are charged 6.0 liters of deionized water, 7.0 liters of methylene chloride, 2225 grams (9.8 moles) of bisphenol-A, 65.7 g (0.2 mole) isopropyl diphenolate, 14 milliliters of triethylamine, 3.4 grams of sodium gluconate, and 32.9 grams (0.35 mole) of phenol. Phosgene is introduced at the rate of 36 grams/minute and phosgenation is continued for 30 minutes. The pH is maintained at between 9.5 and 10.5 by the addition of 25% aqueous sodium hydroxide. After phosgenation has ceased 10 liters of methylene chloride are added, the brine layer is separated by centrifuge and the resin solution is washed with aqueous acid and water. The resin is steam precipitated and dried. The resin has intrinsic viscosity of 0.491.

To this resin is added 0.6 parts by weight per hundred parts by weight of resin of sodium—2,4,5 tricholorobenzene sulfonate and 0.25 parts of a polycarbonate copolymer of bisphenol-A and tetrabromo bisphenol-A containing 30 wt. percent bromine. This resin product is then fed to an extruder operating at a temperature of about 500° F. to extrude the resin into strands and the extruded strands are chopped into pellets. The pellets are then injection molded at about 570° F. into test samples measuring about 5 in×½ in×1/16 in. The intrinsic viscosity of the molded test sample is 0.484. The samples are tested for their flammability characteristics using the procedures described in the Underwriters Laboratory Bulletin 94 publication. The results are given in Table 2.

EXAMPLE 9

The procedure of example 8 is used, except 2157 g (0.95 mole) bisphenol-A and 164 g (0.5 mole) of isopropyl diphenolate are used. The resin has intrinsic viscosity of 0.490. The resin is blended with additives and molded into parts as for Example 8.

The molded parts have intrinsic viscosity of 0.485. The result of UL 94 flammability testing of the sample is given in Table 2.

EXAMPLE 10 (COMPARATIVE EXAMPLE)

Standard polycarbonate resin (Lexan ® 140) is prepared from bisphenol-A by substantially the procedure of Example 8 and blended with additives and molded into parts as for Example 8. The molded parts have intrinsic viscosity of 0.475. The results of UL 94 flammability testing of the sample is given in Table 2.

TABLE 2

| | Ester Resin Composition | | Flammability Testing Results | |
|---|---|---|---|---|
| | Mole % | Structure of R | Rating[1] | Comments |
| Example 8 | 2% | isopropyl | V0 | no bars dripped flaming resin; all bars curled and contracted in the flame |
| Example 9 | 5% | isopropyl | V0 | no bars dripped flaming resin; all bars curled and contracted in the flame |
| Example 10 | None comparative example | — | V2 | two out of five bars dripped flaming resins; all bars elongated in the flame |

[1]Rating in Underwriters Laboratory Bulletin 94 testing on 1/16 inch thick test samples. Five samples were tested for each example.

The polycarbonate resins of the invention containing the units of the Formula (I) given above may also be used in the preparation of block copolymers, with a wide variety of thermoplastic polymers (for example polyamides, polyester, polyurethanes, polyethers and the like). Thus, the polycarbonate resins containing units of the Formula (II) may be blended with a second thermoplastic polymer, as described above. The term "blend" as used herein is meant to define a physical combination of two or more materials which may additionally involve chemical reaction between the two materials. The particular thermoplastic polymer to be blended with the polymer (II) will of course depend on the end use of the blended product. Upon thermal degradation as described above, polymers containing units of the Formula (I) are generated and effect the desired cross-linking.

What is claimed is:

1. A method of cross-linking a resin having sites reactive with a carboxylic group, which comprises;
   adding to the resin a polycarbonate resin, containing in the polymer chain at least one divalent moiety of the formula;

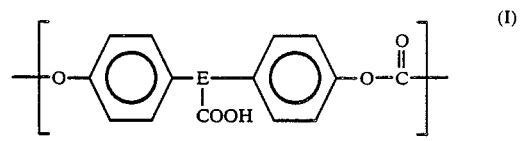

wherein E is selected from the group consisting of a trivalent hydrocarbon radical containing from 1 to 15 carbon atoms, inclusive, and a halogen-substituted hydrocarbon radical containing from 1 to 15 carbon atoms, inclusive.

2. The method of claim 1 wherein the addition is in-situ by first adding to the resin to be cross-linked a polycarbonate resin containing at least one chain moiety of the formula:

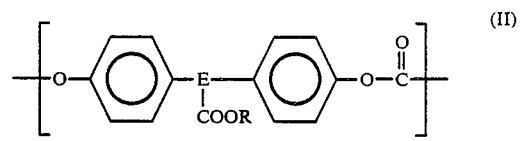

wherein E is selected from the group consisting of a trivalent hydrocarbon radical containing from 1 to 15 carbon atoms, inclusive, and a halogen-substituted hydrocarbon radical containing from 1 to 15 carbon atoms, inclusive, and R is selected from the group consisting of hydrocarbyl and halogen-substituted hydrocarbyl amenable to beta-elimination upon thermal degradation; and
   heating the admixture to a temperature sufficient to cause beta-elimination of the R group.

3. The method of claim 2 wherein E represents $CH_3-C-(CH_2)_2$

4. The method of claim 3 wherein R is alkyl or cycloalkyl.
5. The method of claim 4 wherein R is ethyl.
6. The method of claim 4 wherein R is isopropyl.
7. The method of claim 4 wherein R is 1-ethylpropyl.
8. The method of claim 3 wherein the resin to be cross-linked is a polycarbonate resin.
9. The method of claim 3 wherein the resin to be cross-linked is a polyamide resin.
10. The method of claim 3 wherein the thermal degradation is carried out in the absence of a transesterification catalyst.

* * * * *